US 008799437B1

(12) United States Patent
Kumbhari (10) Patent No.: US 8,799,437 B1
(45) Date of Patent: Aug. 5, 2014

(54) DYNAMIC OPTIMIZATION OF DEVICE MANAGEMENT COMMAND FOR BULK RETRIEVAL OF CONFIGURATION DATA

(75) Inventor: Uday Kishore Kumbhari, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 332 days.

(21) Appl. No.: 12/688,635

(22) Filed: Jan. 15, 2010

(51) Int. Cl.
*G06F 15/173* (2006.01)
*H04L 12/24* (2006.01)

(52) U.S. Cl.
CPC .................................. *H04L 41/0213* (2013.01)
USPC ........................... 709/223; 709/224; 709/226

(58) Field of Classification Search
CPC .................................................. H04L 41/0213
USPC ......................................... 709/223, 224, 226
See application file for complete search history.

(56) References Cited

U.S. PATENT DOCUMENTS

| 5,802,309 | A | 9/1998 | Cooke et al. | |
|---|---|---|---|---|
| 6,574,662 | B2 | 6/2003 | Sugiyama et al. | |
| 7,310,670 | B1 | 12/2007 | Walbeck et al. | |
| 7,752,024 | B2 | 7/2010 | Ball et al. | |
| 7,779,102 | B2 | 8/2010 | Nogawa | |
| 2001/0052006 | A1 | 12/2001 | Barker et al. | |
| 2003/0023605 | A1* | 1/2003 | Sternin et al. | 707/100 |
| 2003/0041134 | A1 | 2/2003 | Sugiyama et al. | |
| 2003/0069963 | A1 | 4/2003 | Jayant et al. | |
| 2005/0198238 | A1 | 9/2005 | Sim et al. | |
| 2005/0228885 | A1* | 10/2005 | Winfield et al. | 709/226 |
| 2006/0190553 | A1* | 8/2006 | Kojima | 709/216 |
| 2006/0235971 | A1* | 10/2006 | McCloghrie et al. | 709/225 |
| 2008/0043634 | A1* | 2/2008 | Wang et al. | 370/252 |
| 2008/0195745 | A1* | 8/2008 | Bowra et al. | 709/231 |
| 2009/0098892 | A1 | 4/2009 | Trogolo et al. | |
| 2010/0023581 | A1* | 1/2010 | Lahav | 709/203 |
| 2010/0260066 | A1 | 10/2010 | August et al. | |
| 2011/0081888 | A1 | 4/2011 | Waniss | |

OTHER PUBLICATIONS

Juirgen Schonwalder, Aiko Pras, Matus Harvan, Jorrit Schippers, Remco van de Meent "SNMP Trafic Analysis: Approaches, Tools, and First Results", Computer Science, Jacobs University, Bremen, Campus Ring 1, 28759 Bremen, Germany, dated 2007.*
Sprenkels et al., "Bulk Transfers of MIB Data," Communication Systems Division (SSC) CH-1015 Lausanne, Switzerland, Mar. 1999, 11 pp., http://infoscience.epfl.ch/record/198/files/TR99_009.pdf.
Schonwalder, "Extending SNMP to Support Bulk MIB Data Transfers," presented on behalf of the Network Management Research Group (NMRG), Jul. 2000, 9 pp., http://www.irtf.org/charters/management.html.

(Continued)

*Primary Examiner* — Boris Gorney
(74) *Attorney, Agent, or Firm* — Shumaker & Sieffert, P.A.

(57) ABSTRACT

Techniques are described for dynamically optimizing a device management command for bulk retrieval of configuration information. A network management device is described in which a programmable processor is configured to issue a bulk data retrieval command to direct the managed network device to retrieve configuration information variables stored within a set of columns of a table within the managed device, receive a response from the managed network device in response to the managed network device querying the table a first number of repetitions, analyze the response, and update an estimate of the number of variables expected to be received from the managed network device in a single response based on the analysis of the response.

39 Claims, 5 Drawing Sheets

(56) References Cited

OTHER PUBLICATIONS

Jagadish et al,. "Network Management Traffic Optimization," Proc. of 14th National Conf. on Communications, NCC-2008, IIT Bombay, Feb. 1-3, 2008, 5 pp.

Case et al., "Protocol Operations for version 2 of the Simple Network Management Protocol (SNMPv2)," RFC 1448, Apr. 1993, 36 pp.

Godura et al., "Use of Control Variables to Convey Protocol Semantics in SNMP," Oct. 1995, IEEE, 11 pp.

* cited by examiner

| Column | Repetition 1 | Repetition 2 | Repetition 3 | Repetition 4 | Repetition 5 |
|---|---|---|---|---|---|
| A | A.1 | A.2 | A.3 | A.4 | VarBind outside A |
| B | B.1 | B.2 | B.3 | B.4 | VarBind outside B |
| C | C.1 | C.2 | C.3 | C.4 | VarBind outside C |

FIG. 2C

| Column | Repetition 1 | Repetition 2 | Repetition 3 | Repetition 4 | Repetition 5 |
|---|---|---|---|---|---|
| A | A.1 | A.2 | A.3 | VarBind outside A | VarBind outside A |
| B | B.1 | B.2 | B.3 | VarBind outside B | NULL |
| C | C.1 | C.2 | C.3 | VarBind outside C | NULL |

DYNAMIC OPTIMIZATION OF DEVICE MANAGEMENT COMMAND FOR BULK RETRIEVAL OF CONFIGURATION DATA

TECHNICAL FIELD

The invention relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

A conventional network device, such as a router, typically includes a mechanism, such as a management interface, to locally or remotely configure the device. By interacting with the management interface, various clients, such as human users and automated scripts, can perform configuration tasks. For example, the clients may configure interface cards of the device, adjust parameters for supported network protocols, specify physical components within the device, modify routing information maintained by a router, access software modules and other resources residing on the device, and perform other configuration tasks.

The Simple Network Management Protocol (SNMP) is a standard defined by the Internet Engineering Task Force (IETF) for managing network devices. SNMP uses an extensible design that incorporates management information bases (MIBs) to define and store configuration data that is available in a managed device. Specifically, MIBs describe the structure of the management data of a network device by using a namespace that contains object identifiers. Each object identifier identifies a variable of configuration data within the network device that can be read or set by the client via SNMP, where the variable represents a specific characteristic (e.g., configurable parameter) about the managed device. MIBs typically manage two basic types of objects; scalar objects and tabular objects. Tabular objects define multiple related object instances and group them into MIB tables, sometimes called SNMP tables. MIBs are often hard-coded into a managed device, and a unique MIB typically exists for each management format area implemented by a management device. Management devices, such as computer consoles, utilize SNMP MIBs to manage devices of a network, such as routers, switches, and other network devices.

The SNMP standard defines several commands that an SNMP management application running on an SNMP management system must support for managing remote network devices. The SNMP management application issues the commands to an SNMP agent executing on the managed device. In version two of the SNMP standard recently announced, generally referred to as SNMPv2, these commands include Get, GetNext, Set, and GetBulk. When issued by the SNMP management application, the Get and GetNext commands, for example, each retrieve a single scalar or tabular object from a MIB of the targeted network device. When retrieving several scalar or tabular objects, it may be more efficient for the management application to issue a GetBulk command because, as defined by SNMPv2 a single GetBulk command may be used to retrieve multiple scalar and tabular objects from the MIB rather than requiring the management application to issue multiple Get or GetNext commands to the remote network device.

As defined, the GetBulk command takes several parameters including one or more scalar or tabular object identifiers, an integer value corresponding to the number of object identifiers for which only a single value is to be retrieved (non-repeaters), and a maximum number of repetitions (max-repetitions) for the remaining object identifiers. In operation, the GetBulk command is internally translated by the SNMP agent running on the remote network device into a set of GetNext commands, one for each non-repeating object identifier and a number of sequential GetNext commands for the remaining object identifiers equal to the number specified by the max-repetitions parameter. The GetBulk command permits the SNMP management application to fetch more data in a single command. However, SNMP does not provide means for the management application to determine the number of rows in an SNMP table located within the MIB of the remote network device being managed. As a result, if the max-repetitions parameter is set too low by the issuing management application, then the performance of the request when implemented by the remote network device may be no better than a series of GetNext commands resulting in an inefficient use of the GetBulk command. If the max-repetitions value is set too high, the response may contain information outside the scope of the requested or the SNMP agent may crash when trying to allocate more memory than is possible, thus allowing the SNMP GetBulk command to be used as the basis of a denial of service attack.

Previous solutions for determining and setting the max-repetitions parameter of the GetBulk command were directed to adding new SNMP protocol operations to retrieve the row count of the SNMP table, to retrieve a sub-tree of the table such that only the columns specified are fetched in a single-request, multiple-response way, or to put a filter criteria inside the SNMP request so that only the requested columns will be fetched. Other previous solutions include putting a proxy on the SNMP agent that fetches required columns only and then the proxy sends them to the SNMP management application and adding a scalar SNMP variable inside the MIBs for each table to represent the row count in that table. However, when adding new SNMP protocol operations, all SNMP management and managed devices must be modified or upgraded at significant administrative expense. Similarly, modifying the SNMP agent and adding a proxy on the SNMP agent both require at least updating all SNMP managed devices again, at significant administrative expense.

SUMMARY

In general, techniques are described that enable more efficient use of a network management command for the bulk retrieval of configuration data. The techniques may be particularly useful for a bulk data retrieval command that, when executed on the managed network device, is internally translated into the number of similar sub-commands specified in a parameter of the network management bulk data retrieval command. For example, the techniques may be applied to the SNMP GetBulk command to optimize the efficiency of the GetBulk command without requiring any modification to the SNMP software executing on the managed devices. In one example, the techniques may be applied using an SNMP management device interacting with an SMNP software agent programmed in accordance with the SNMPv2 standard and executing on an SNMP managed device. As another example, the SNMP management application may tune (i.e., dynamically update) the max-repetitions parameter of the SNMP GetBulk command based on the GetBulk response received from the SNMP agent to optimize the resources on both the SNMP management device and the SNMP managed device as well as minimize the network bandwidth required, while ensuring that the SNMP management application achieves the best overall response time.

The SNMP GetBulk optimization technique described herein uses several variables to determine an optimal value of the max-repetition parameter of the GetBulk command to maximize resource utilization when the value of the non-repeaters parameter is set to zero, i.e., the GetBulk command is applied to retrieve columns in a table of a management information base (MIB). The max-repetitions parameter of the GetBulk command defines the number of internal Get-Next requests the SNMP agent will apply against the MIB of the network device in response to receiving the GetBulk command. If the max-repetitions parameter is set to a very low value, GetBulk may have performance similar to a series of GetNext requests. However, if the max-repetitions parameter is set to too high, the SNMP agent may not be able to include all of the response variable bindings into GetBulk response, resulting in several response variable bindings not being included in the response transmitted to the SNMP management application.

In accordance with the techniques described herein, the SNMP management device uses an EST_VARBIND variable to store an estimate of the number of configuration variables the SNMP agent is capable of returning in a single GetBulk response. The technique allows an EST_VARBIND variable value to be stored in a memory of the SNMP management device for each SNMP managed device as identified by an Internet Protocol (IP) address for quick and easy retrieval when querying the same table in the same SNMP managed device MIB at a later time. For example, when sending a GetBulk request after tuning the max-repetitions parameter for a particular table of a managed device, the SNMP management application may retrieve the stored EST_VARBIND value and set the initial max-repetitions value to equal the stored EST_VARBIND value divided by the number of columns to be queried in the GetBulk command for that particular table in the MIB.

In one example, a method includes issuing, with a management device, a bulk data retrieval command to direct a managed network device to retrieve configuration variables stored within a set of columns of a table within the managed device, wherein the bulk data retrieval command includes a repetition parameter that specifies a number of repetitions for the managed device to internally query the set of columns of the table when processing the bulk data retrieval command, and wherein the repetition parameter is set based on an estimate of a number of the variables expected to be received from the managed network device in a single responses to the bulk data retrieval command. The method further includes receiving, with the management device, a response from the managed network device in response to the managed network device querying the table the first number of repetitions, executing software on the management device that analyzes the response, and updating the estimate of the number of variables expected to be received from the managed network device in a single response based on the analysis of the response by the management device.

In another example, a network management device comprises a programmable processor that is configured to issue a bulk data retrieval command to direct the managed network device to retrieve configuration information variables stored within a set of columns of a table within the managed device, wherein the bulk data retrieval command includes a repetition parameter that specifies a number of repetitions for the managed device to internally query the set of columns of the table when processing the bulk data retrieval command, and wherein the repetitions parameter is set based on an estimate of a number of the variables expected to be received from the managed network device in a single response to the bulk data retrieval command. The programmable processor of the network management device is further configured to receive a response from the managed network device in response to the managed network device querying the table a first number of repetitions, analyze the response, and update the estimate of the number of variables expected to be received from the managed network device in a single response based on the analysis of the response.

In another example, a system comprises a managed network device, and a management device, wherein the management device further comprises a programmable processor. The programmable processor of the management device is configured to issue a bulk data retrieval command to direct the managed network device to retrieve configuration information variables stored within a set of columns of a table within the managed device, wherein the bulk data retrieval command includes a repetition parameter that specifies a number of repetitions for the managed network device to internally query the set of columns of the table when processing the bulk data retrieval command, and where the repetitions parameter is set based on an estimate of a number of the variables expected to be received from the managed network device in a single response to the bulk data retrieval command. The programmable processor of the management device is also configured to receive a response form the managed network device in response to the managed network device querying the table a first number of repetitions, analyze the response, and update the number of variables expected to be received from the managed network device in a single response based on the analysis of the response.

In another example, a computer-readable medium comprises instructions for causing one or more programmable processors issue a bulk data retrieval command to direct the managed network device to retrieve configuration information variables stored within a set of columns of a table within the managed device, wherein the bulk data retrieval command includes a repetition parameter that specifies a number of repetitions for the managed network device to internally query the set of columns of the table when processing the bulk data retrieval command, and where the repetitions parameter is set based on an estimate of a number of the variables expected to be received from the managed network device in a single response to the bulk data retrieval command. The instructions further comprise instructions for causing the one or more programmable processors to receive a response from the managed network device in response to the managed network device querying the table a first number of repetitions, analyze the response, and update the number of variables expected to be received from the managed network device in a single response based on the analysis of the response.

The techniques described herein may present several advantages. For example, the techniques described herein may reduce the time spent fetching one or more columns from a table. The techniques may also be used with any SNMP agent executing on an SNMP managed device that is operating in accordance with the SNMPv2 or newer standard, thereby permitting a simple update of the SNMP Management application on the SNMP Management device without requiring updating the SNMP Agent on each SNMP Managed device, reducing administration costs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
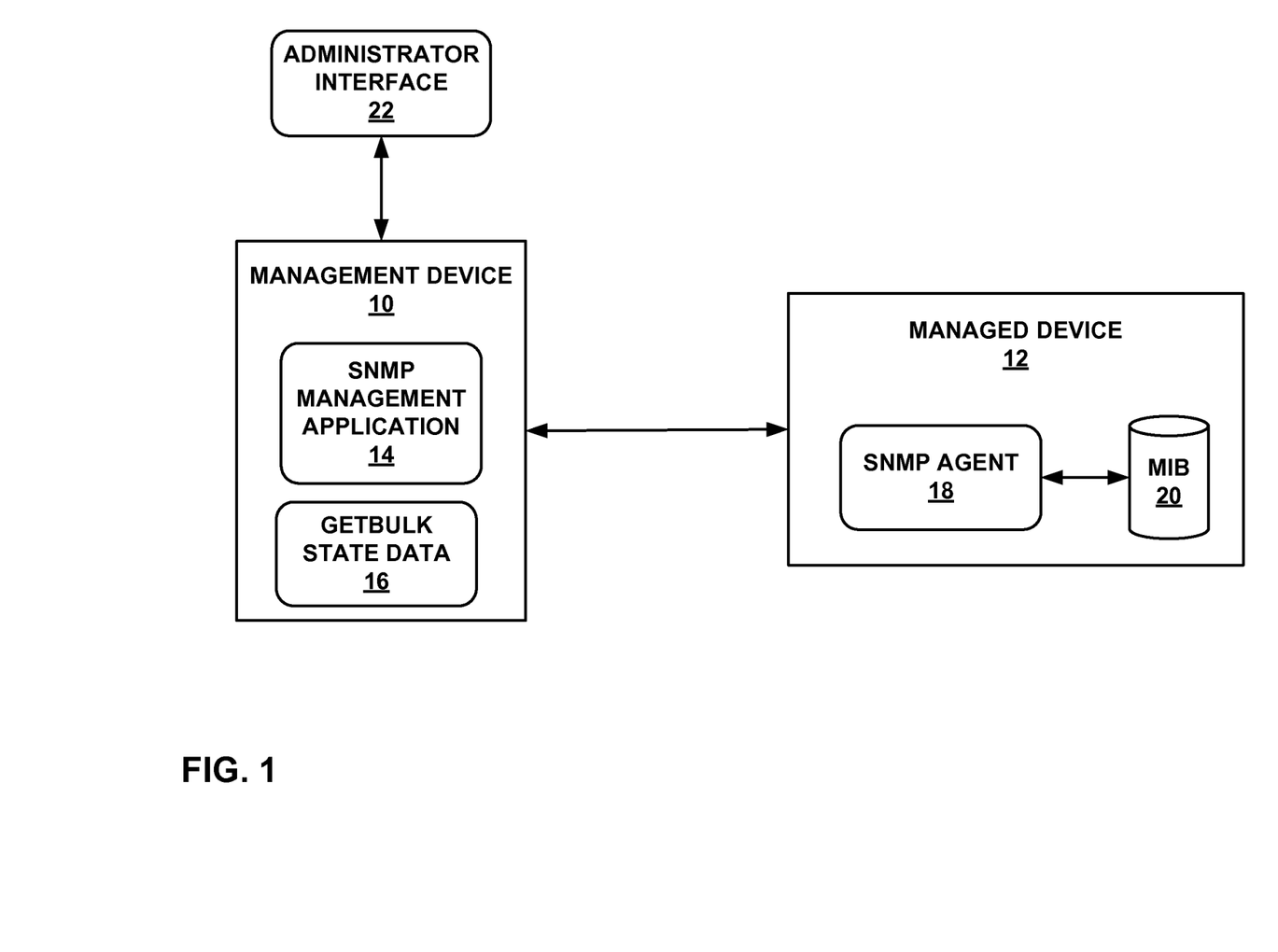
FIG. 1 is a block diagram illustrating one example management system that may implement the techniques described in this disclosure.

FIG. 1 is a block diagram illustrating an example management device 10 in which a management device 10 manages managed device 12 using a management protocol, such as SNMP. Management device 10 executes a management application, i.e. SNMP management application 14, which monitors and controls one or more managed devices 12. An operator interacts with administrator interface 22 to direct SNMP management application 14 to manage the managed device 12, e.g. to modify the configuration of managed device 12 or to monitor the performance of managed device 12. As another example, SNMP management application 14 may be configured to automatically check the configuration or monitor the performance of managed device 12 at specified times, e.g. twice per day or once per month.

Managed device 12 may be any device having one or more processors and a memory, and that is capable of executing one or more software processes, i.e. SNMP agent 18, that operates in accordance with the SNMPv2 or newer specification. For example, managed device 12 may be a router, switch, bridge, access server, computer or printer. Managed device 12 stores configuration data in a structured form, such as a management information base (MIB) 20. The configuration data typically defines parameters and settings for a characteristic of a component or element that can be managed, such as a list of currently active interfaces of managed device 12, information describing the relationships between multiple sub-layers of network interfaces, information describing and providing status information for IEEE 802.3 Medium Attachment Units (MAUs), or the like.

When management device 10 is implemented using SNMP, SNMP management application 14 sends SNMP commands, such as GetBulk, GetNext, Get, and Set, to SNMP agent 18. SNMP agent 18 processes the commands and executes one or more queries on MIB 20, where the queries correspond to the particular SNMP command sent by SNMP management application 14. For example, an operator or script may use administrator interface 22 to direct SNMP management application 14 of management device 10 to issue a GetNext command. In one example, the GetNext command is applied to retrieve tabular objects and requires a set of parameter values including parameters specifying the table of MIB 20 to be queried, the columns of the table to be queried, and a particular row of the table to be queried. The GetNext command is received by SNMP agent 18 of managed device 12. SNMP agent 18 then processes the command according to the SNMPv2 specification and queries the table of MIB 20 specified by the parameter values. The query response includes the configuration information of the next row of the table following the particular row specified by the GetNext parameter values. SNMP agent 18 receives the query response from MIB 20 and transmits the response to SNMP management application 14 for processing, analysis, or to display the results of the command to the operator via administrator interface 22. The same example may be executed automatically by SNMP management application 14, if so configured.

In another example, the operator or script directs SNMP management application 14 to issue an SNMP GetBulk command. When the GetBulk command is applied to retrieve tabular objections, the GetBulk command requires a set of parameters, which may include a max-repetitions parameter and object identifiers that specify the table, columns, and initial row to be queried. The operator sets the parameter values via administrator interface 22 and SNMP management application 14 sends the GetBulk command to SNMP agent 18. SNMP agent 18 internally processes the GetBulk command into one or more GetNext commands to be applied to MIB 20, where the number of GetNext commands equals the number specified by the max-repetitions parameter of the GetBulk command. In this example, SNMP agent 18 executes all of the generated GetNext commands and combines the results into a single GetBulk response, which is then sent to SNMP management application 14.

The number of results retrieved by a GetBulk command depends upon the number of columns queried and the number specified by the max-repetitions parameter. For example, if three columns are queried and max-repetitions is set to five, fifteen results may be returned in the response. When implementing the GetBulk and GetNext commands, the SNMP agent 18 is unaware of column boundaries and, therefore, may retrieve data from columns of MIB 20 other than the desired columns, causing erroneous results to be included in the response to management device 10. For example, if a table only contains three rows, but max-repetitions as received from management device 10 is set to four, the final GetNext repetition applied by SNMP agent 18 will return results outside of the column or table specified in the initial GetBulk command. The operator or SNMP management application 14 may need to filter out the erroneous results to properly manage managed device 12 or may otherwise be confused by the data.

In some cases, the GetBulk response returned to management device 10 may contain fewer than the optimal number of results, or the GetBulk response may not be able to include all of the results returned by the queries executed by SNMP agent 18. For example, if the GetBulk response is capable of returning twenty variables, but the GetBulk command only directed SNMP agent 18 to retrieve five variables, more GetBulk commands and responses are required than is optimal, increasing the bandwidth required between management device 10 and managed device 12 and increasing the resources required to retrieve the desired results from MIB 20. As another example, a GetBulk response may be limited to single packet of a maximum number of bytes as determined by the configuration of the particular SNMP agent 18 or the particular managed device 12. If more information is returned from the set of GetNext commands than will fit into a single GetBulk response, SNMP agent 18 may not be able to include all of the results and may simply drop the additional results leading to an incomplete result set.

After SNMP management application 14 receives a response from managed device 12, SNMP management application 14 dynamically analyzes the contents of the response and stores information about the response in Get-Bulk state data 16 so as to improve the efficiency of subsequent GetBulk requests in accordance with the techniques described here. In one example, SNMP management application 14 analyzes a response and may determine that the response is capable of containing sixteen results and that the table specified by the GetBulk command contains three rows. SNMP management application 14 may store this information, along with the IP address corresponding to managed device 12 in GetBulk state data 16. If, at a later time, SNMP management application 14 is directed to send another GetBulk command to managed device 12, SNMP management application 14 may retrieve, from GetBulk state data 16, the number of results able to be stored in a response packet from managed device 12.

FIGS. 2A-2D depict example GetBulk responses to illustrate the principles described herein. In FIGS. 2A-2D, responses 30, 40, 50, and 60 include repetitions 32, 42, 52 and 62, columns 34, 44, 54 and 64, and results 36, 46, 56 and 66, respectively. Responses 30, 40, 50, and 60 illustrate different possible responses to a GetBulk command that specified columns A, B and C of a table of MIB 20 and where the max-repetitions parameter of the GetBulk command was set to five by SNMP management application 14. In all cases, SNMP agent 18 internally processed the GetBulk command into five GetNext commands and executed the five GetNext commands to query columns A, B and C of a table stored in MIB 20. Repetitions 32, 40, 48, and 56 illustrate the information contained in each of the GetBulk responses generated by SNMP agent 18 by combining results for each of the five repetitions of the GetNext commands generated by the SNMP agent. The results of the five GetNext commands correspond to repetitions one through five, where each of the GetNext commands are applied to columns A, B and C.

The size of a GetBulk response packet may be limited by configuration parameters of either managed device 12 or SNMP agent 18. For example, the response packet may be limited based on a packet data unit (PDU) setting for SNMP or managed device 12. SNMP agent 18 may limit the response packet by limiting the response packet to a certain number of bytes, by setting a maximum number of variable bindings that may be included in a response packet, or through some combination of limiting the number of bytes and limiting the number of variable bindings in a response packet. Different vendor implementations of SNMP agent 18 may limit the GetBulk response to different numbers of bytes when forming the response as a single response packet.

Figure 2A:
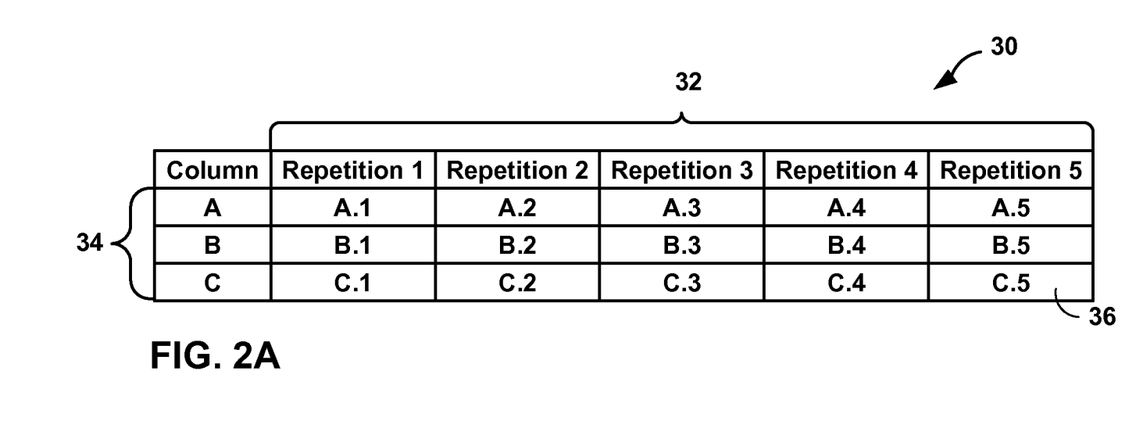
FIGS. 2A-2D are example responses that may be generated by a managed network device.

In FIG. 2A, results A.1, B.1, and C.1 of results 36 are the values returned by the first GetNext command (repetition 1) applied by SNMP agent 18. Values A.2, B.2, and C.2 of results 36 are returned by the second GetNext command (repetition 2) and so forth through values A.5, B.5, and C.5 of results 36 returned by the fifth GetNext command (repetition 5). Response 30 illustrates a response where all of the results included in the response correspond to the queried columns, i.e. are relevant results, and where all of the desired results are included in the response. In this example, additional variables may be stored in a single response packet. Thus, the value of max-repetitions is increased, causing a subsequent GetBulk command to request additional variables and quickly determining the maximum number of variables able to be stored in a single response packet.

Figure 2B:
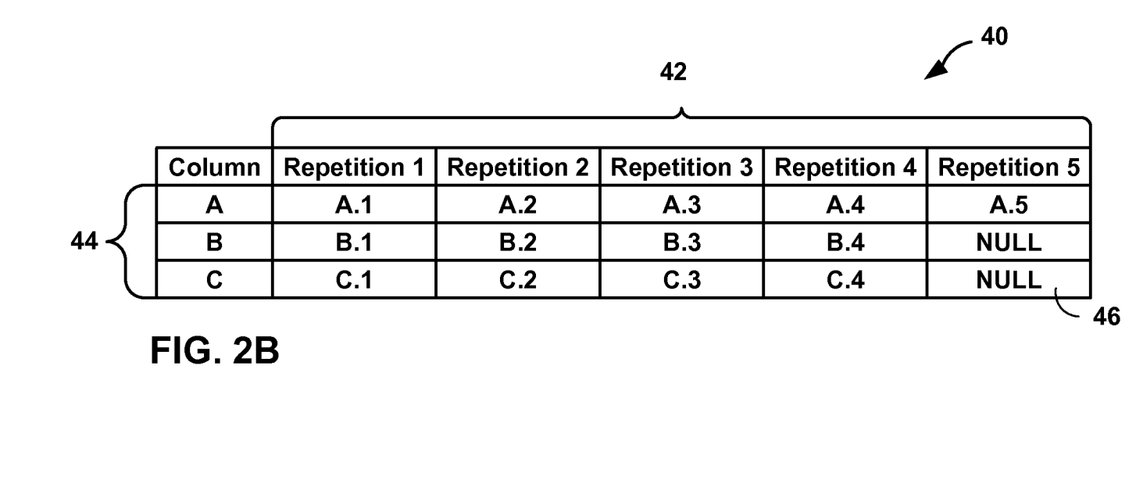

In FIG. 2B, response 40 includes two NULL values in results 46 in repetition 5 of repetitions 42, illustrating a response where not all of the results fit into a single GetBulk response. This may occur when either the response packet exceeded the maximum allowable packet size or the number of variables requested by the GetBulk command exceeded the maximum number of variables SNMP agent 18 allows to be included in a response packet. The techniques of this disclosure analyze the response and adjust the max-repetitions parameter to ensure all requested results are included in the response packet. In this example, the value of max-repetitions is decreased to avoid exceeding the response packet limitations while maximizing the effectiveness of the GetBulk command.

Figure 2C:
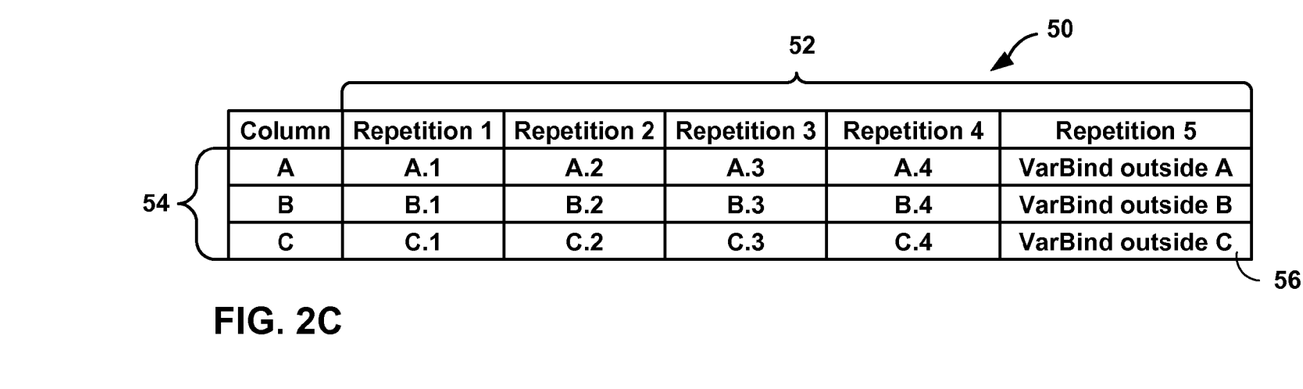

In FIG. 2C, response 50 includes three values in results 56 in repetition 5 of repetitions 52 where the results include variable bindings that correspond to values outside of columns A, B, and C, i.e. VarBind outside A, illustrating the example where the queried table only has four rows total or four rows that had not yet been queried. If the table contains fewer rows or has fewer rows remaining to be queried than the value of max-repetitions, GetBulk will return variables from outside the desired table. In the example, column boundaries are crossed and the method terminates. Based on the analysis of response 50, the method updates the number of rows in the queried table and the estimated number of variables able to be stored in a singled response packet and stores them in GetBulk state data 16 for future reference.

Figure 2D:
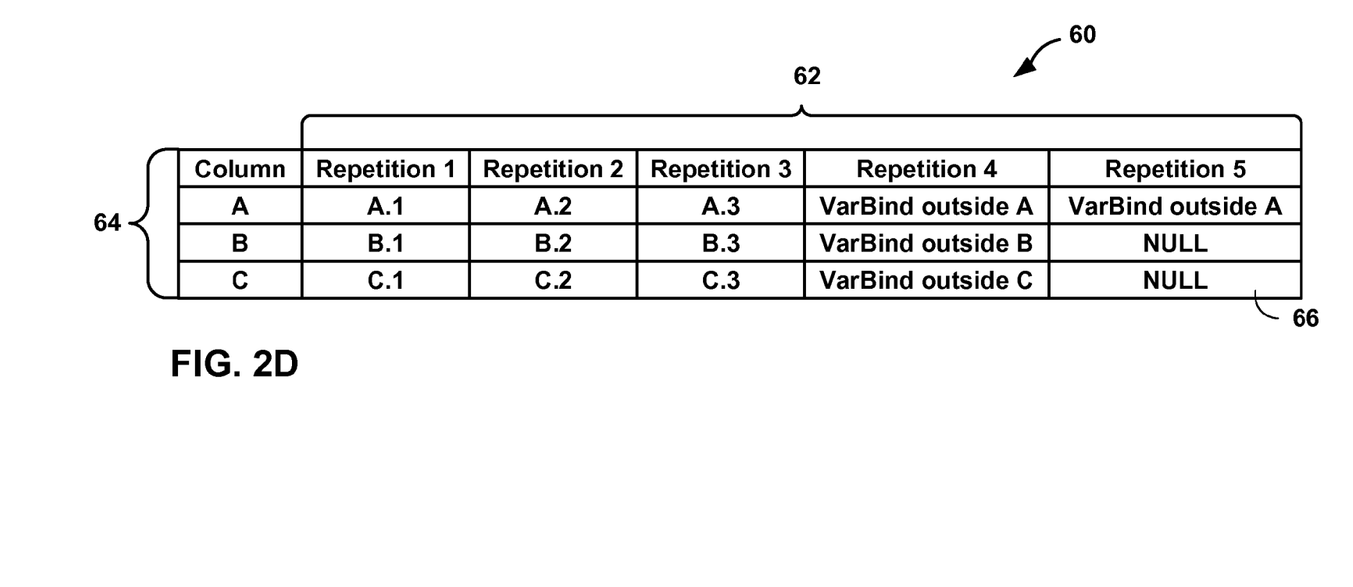

In FIG. 2D, response 60 includes both values outside of columns A, B, and C and NULL values, illustrating that the queried table only has three rows and that not all of the desired results fit into a single GetBulk response. In this example, the number of rows in the table and the estimated number of variables able to be stored in a response are updated based on analyzing the response packet. The number of rows in the table is incremented by the number of rows received in this response and the estimated number of variables is set to the total number of variables included in the response, irrespective of whether the variables are from the queried table or from another table. In all of the examples illustrated by FIGS. 2A-2D, the updated values are stored in GetBulk state data 16 of management device 10 for later use to more quickly reach the optimum max-repetitions parameter value when management device 10 issues additional GetBulk commands to managed device 12.

Figure 3:
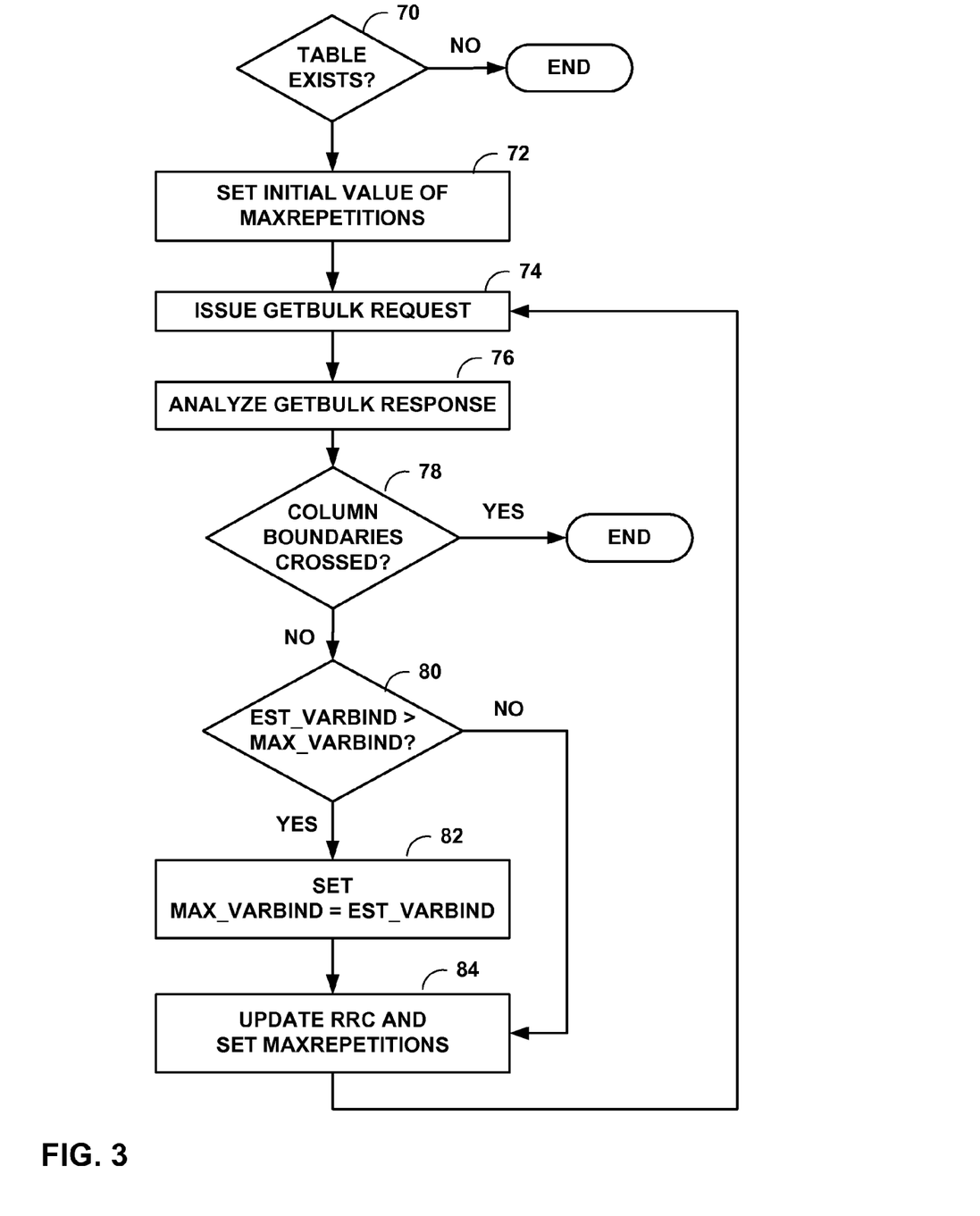
FIG. 3 is a flowchart illustrating an example method to optimize SNMP GetBulk requests using the techniques of this disclosure.

FIG. 3 is a flowchart illustrating an example method to optimize a GetBulk command by adaptively controlling the number of GetNext commands internally generated by the SNMP agent to achieve maximum efficiency using the techniques of this disclosure. The techniques described in this disclosure, several method variables are used in optimizing a GetBulk command. The method variables are merely examples and the number of variables used in optimizing a GetBulk command may vary, depending upon the particular implementation of the techniques disclosed.

In the example method shown in FIG. 3, SNMP management agent 14 maintains GetBulk state data 16 to store a set of variables used in optimizing a GetBulk command for each different table within MIB 20 for each managed device, e.g., managed device 12. In one embodiment, state data 16 includes for each table an expected row count (ERC), a received row count (RRC), the number of columns being queried (NUM_COL), an application defined lower initial value for the maximum number of results expected in one response (MIN_VARBIND), an application defined higher and maximum value for the maximum number of results expected in one response (MAX_VARBIND), an estimated maximum number of results expected in one response that is derived based upon analyzing one or more received responses (EST_VARBIND), and an application-defined extension value used to increase the max-repetitions parameter value (EXT).

When initiating a GetBulk request, ERC within GetBulk state data 16 for a given table may already be set to a previously calculated number of rows in the table or initialized to a value corresponding to an unknown estimated row count. If the number of rows in the table was not previously calculated or if SNMP management application 14 is unable to retrieve the previously calculated number of rows in the table, ERC may be set to a value that signals to SNMP management application 14 that ERC is not known, such as a negative number.

Prior to sending a first GetBulk command to managed device 12 for a given table, RRC is set to zero. As explained in further detail below with respect to step 100, when SNMP management application 14 receives a GetBulk response from SNMP agent 18, SNMP management application 14 counts the number of relevant rows received in the response and increments the value of RRC for that table. RRC is then incremented by the number of relevant rows received in each GetBulk response. When all of the relevant rows are received, the last calculated RRC value equals the number of rows in the queried table and is stored in GetBulk state data 16 for later retrieval by SNMP management application 14 for use in setting ERC, as described above. Consequently, when issuing a GetBulk command in accordance with the method set forth in FIG. 3, RRC for the particular table may be set to zero or may have a value based on one or more previously issued GetBulk commands for that same table.

In any event, when issuing a GetBulk command, as shown in FIG. 3, SNMP management application 14 first confirms that a desired table exists in MIB 20 for the managed device 12 being queried (70). SNMP management application 14 may issue a single GetNext command on the table to be queried. If the response received from the GetNext command is a value from the desired table (YES in 70), then that table is present and GetBulk can be used. If the response received is not a value from the desired table (NO in 70), then the method terminates.

Once it is determined that the table exists, SNMP management application 14 sets an initial value for the max-repetitions parameter of the GetBulk command (72). In one example, SNMP management application 14 receives the initial value from an operator via administrator interface 22. In another example, SNMP management application 14 retrieves a previously stored value from GetBulk state data 16. In another example, SNMP management application 14 retrieves stored information associated with a different table of MIB 20 of managed device 12 and predicts the initial value of max-repetitions based on the stored information. For example, a first table of network intefaces (ifXTable) of MIB 20 for a router may generally have the same number of rows of a second similar interface table (ifTable) of MIB 20 for that router. If so, SNMP management application 14 may be configured to predict an initial value for the max-repetitions parameter for accessing the ifXtable table with a GetBulk command based on state data 16 from previously issued GetBulk commands for the ifTable table. For example, if the GetBulk command is directed to the ifXTable of MIB 20 and the ifTable of MIB 20 was previously examined by the techniques of this disclosure such that EST_VARBIND and RRC was calculated and stored in GetBulk state data 16, then SNMP management application 14 will retrieve the values of EST_VARBIND and RRC from GetBulk state data 16 and predict the initial value of max-repetitions based on the stored values associated with ifTable of MIB 20. As another example, the ifStackTable has approximately twice as many rows as are present in the ifTable. If the GetBulk command is directed to the ifStackTable and the ifTable of MIB 20 was previously examined by the techniques of this disclosure such that EST_VARBIND and RRC was calculated and stored in GetBulk state data 16, then SNMP management application 14 will retrieve the values of EST_VARBIND and RRC from GetBulk state data 16 and predict the initial value of max-repetitions based on the stored values associated with the ifTable of MIB 20.

In another example, SNMP management application 14 calculates an initial max-repetitions value by selecting the lowest value of a number of possible values, which may include one or more of: (1) a number of rows calculated based on ERC and incremented by EXT, i.e. ERC+EXT, if ERC is known, otherwise a number of rows calculated based upon the values of MIN_VARBIND and NUM_COL and then incremented by EXT, i.e. (MIN_VARBIND/NUM_COL)+EXT; (2) a number of rows calculated based upon the values of MAX_VARBIND and NUM_COL and then incremented by EXT, i.e. (MAX_VARBIND/NUM_COL)+EXT; and (3) a number of rows calculated based upon the values of EST_VARBIND and NUM_COL and then incremented by EXT, i.e. (EST_VARBIND/NUM_COL)+EXT, but only if EST_VARBIND is known.

For example, where MIN_VARBIND is set to five, MAX_VARBIND is set to one hundred, EXT is set to ten, NUM_COL is set to five and ERC and EST_VARBIND are not known, the initial value of max-repetitions will be set to the smallest of: (1) a number of rows calculated based upon MIN_VARBIND and NUM_COL and then incremented by EXT, i.e. (MIN_VARBIND/NUM_COL)+EXT, or (five divided by five) plus ten, which equals eleven; and (2) a number of rows calculated based upon the values of MAX_VARBIND and NUM_COL and then incremented by EXT, i.e. (MAX_VARBIND/NUM_COL)+EXT, or (one hundred divided by five) plus ten, which equals thirty. The number of rows calculated based upon the values of EST_VARBIND and NUM_COL is not calculated because EST_VARBIND is not known. Similarly, the number of rows based upon ERC and incremented by EXT is not calculated because ERC is not known. Therefore, in this example, the initial value of max-repetitions would be set to eleven.

In another example, ERC is known and is set to ten and EST_VARBIND is known and is set to ninety, the values of the other variables are as described above. In this example, the initial value of max-repetitions will be set to the smallest of: (1) ERC+EXT, i.e. ten plus ten, which equals twenty; (2) (MAX_VARBIND/NUM_COL), i.e. one hundred divided by five, which equals thirty; and (3) (EST_VARBIND/NUM_COL)+EXT, i.e. ninety divided by five, plus ten, which equals twenty-eight. Therefore, the initial value of max-repetitions is set to twenty.

In another example, ERC is not known, EST_VARBIND is known and is set to ninety, and the values of the other variables are as described above. In this example, SNMP management application 14 sets the initial value of max-repetitions to (EST_VARBIND/NUM_COL)+EXT, i.e. ninety divided by five, plus ten, which equals twenty-eight.

Once the initial value of max-repetitions is calculated and set, SNMP management application 14 issues a GetBulk command (74) to SNMP agent 18. The GetBulk command includes parameters as specified by the SNMPv2 or newer standard, such as max-repetitions and object identifiers that specify the table and columns to be queried. Furthermore, SNMP agent 18 processes the GetBulk command according the SNMPv2 or newer standard meaning that SNMP agent 18 receives the GetBulk command and processes the command into a series of GetNext commands based on the value of the max-repetitions parameter. If, for example, max-repetitions is set to five, SNMP agent 18 processes the GetBulk command into five separate internal GetNext commands with parameter values corresponding to the parameter values specified in the GetBulk command.

Continuing the example, SNMP agent 18 then executes each of the GetNext commands, thereby executing five queries against the table and columns of MIB 20 specified by the GetBulk parameters. After executing the first query, SNMP agent 18 receives a result and sets the parameter values of the second GetNext command such that the GetNext command retrieves the row of the table occurring immediately after the row which was retrieved with the previous GetNext command. SNMP agent 18 will continue in this manner until all of the GetNext commands are executed. The SNMPv2 protocol allows a GetNext command to retrieve rows outside of the column or table specified by the GetBulk command. Therefore, it is possible for one or more of the GetNext commands generated by SNMP agent 18 to retrieve information that is not relevant to the desired table or columns specified in the GetBulk request, as shown in the examples above with respect to FIGS. 2A-2D.

In one example, after executing at least one of the generated GetNext commands, SNMP agent 18 begins formulating the GetBulk response. SNMP agent 18 may attempt to append additional received results to the GetBulk response being formed as additional GetNext commands are internally executed. In another example, SNMP agent 18 may wait until all GetNext commands have completed executing before combining the results to form the GetBulk response. In either example, the size of the GetBulk response, in terms of the number of bytes, may be limited by SNMP agent 18. Different vendor implementations of SNMP agent 18 may limit the GetBulk response to different numbers of bytes when forming the response as a single response packet. In other situations, the response packet may be limited based on a PDU setting for SNMP or managed device 12. If all of the results fit into the GetBulk response, SNMP agent 18 will include all of the results as shown, for example, in FIGS. 2A and 2C. However, if only a subset of the results fit into the GetBulk response as formed as a single response packet, SNMP agent 18 typically only includes the subset of the results that fit and discards any additional results as shown, for example, in FIGS. 2B and 2D.

SNMP agent 18 sends the generated GetBulk response to SNMP management application 14 and SNMP management application 14 analyzes the GetBulk response (76). SNMP management application 14 may, for example, calculate the value of EST_VARBIND, calculate the effective number of max-repetitions, calculate the number of rows received in the response, and determine if the GetBulk response includes results outside the desired columns of the table. When calculating the value of EST_VARBIND, SNMP management application 14 analyzes the response and compares it to the expected response. For example, if the GetBulk command includes parameter values indicating that three columns are to be queried and max-repetitions is set to five, SNMP management application 14 expects the response to contain fifteen variable bindings, as shown in FIGS. 2A and 2C. If the GetBulk response contains all fifteen variable bindings, SNMP management application 14 sets EST_VARBIND to fifteen. If the GetBulk response contains fewer than fifteen variable bindings, as shown in FIGS. 2B and 2D, SNMP management application 14 sets EST_VARBIND to the number of variable bindings actually contained in the response. In the example shown by response 40, EST_VARBIND is set to thirteen.

When calculating the effective number of max-repetitions, SNMP management application 14 analyzes the response and compares it to the expected response in a similar manner as to when SNMP management application 14 calculates the value of EST_VARBIND. If the GetBulk response contains all of the expected variable bindings, the effective number of max-repetitions is equal to the value of max-repetitions that was passed to SNMP agent 18 in the GetBulk command, which, in this case, is five. However, if the GetBulk response contains fewer than the expected fifteen variable bindings, such as thirteen, max-repetitions is set to the number of repetitions that include results for every queried column. Referring to FIGS. 2B and 2D, repetition 4 of repetitions 42 and repetitions 4 of repetitions 62 are the last repetition that includes responses for every queried column. Therefore, in responses 40 and 60, the effective number of max-repetitions is four.

SNMP management application 14 also determines the number of rows received in the GetBulk response. Each repetition of the response represents one row in the table. When determining the number of rows received, SNMP management application 14 examines how many repetitions in the response include results for every queried column as well as whether the results for each repetition include only results from the desired column. Referring to FIG. 2C, the response includes four repetitions that include only results from the desired columns and a fifth repetition that includes results from outside the desired columns. In this example, the number of rows received equals four. Similarly, referring to FIG. 2D, the response includes three repetitions that include only results from the desired columns, a fourth repetition that includes results from a column outside of the desired columns, and a fifth repetition where only one result was returned and where that result is from a column outside of the desired columns. In this example, the number of rows received in the GetBulk response is three.

SNMP management application 14 not only analyzes the number of variable bindings contained in the response, but SNMP management application 14 also determines whether the column boundaries were crossed, i.e. whether the response contains variable bindings outside of the desired columns. Continuing the example where three columns are queried and max-repetitions is set to five, if all of the results included in the response correspond to the desired columns, as shown in FIGS. 2A and 2B, then the column boundaries have not been crossed. The GetBulk response may only include a truncated result set due to an insufficient number of bytes available in the response to include all of the results. However, as long as all of the included results correspond to the desired columns, the column boundaries have not been crossed. If, instead, the GetBulk response includes results corresponding to columns outside of the desired columns, as shown in FIGS. 2C and 2D, then the column boundaries have been crossed.

If the column boundaries have been crossed (YES in 78), SNMP management application terminates tuning the max-repetitions parameter and stores the calculated values of EST_ VARBIND and RRC as well as information that uniquely identifies the particular managed device 12 and table of MIB 20 that was the subject of the GetBulk command. However, if the column boundaries have not been crossed (NO in 78), then SNMP management application 14 determines if the calculated EST_VARBIND value is greater than the MAX_VARBIND value (80). If EST_VARBIND is greater than MAX_VARBIND (YES in 80), then MAX_VARBIND is set to the value of EST_VARBIND (82). If EST_VARBIND is not greater than MAX_VARBIND (NO in 80), then the value of MAX_VARBIND is not changed.

Next, the received row count (RRC) is updated with the number of rows received in the GetBulk response and the value of max-repetitions is updated (84). When SNMP management application 14 issues the first GetBulk response as part of this tuning process, RRC is set to zero. As SNMP management application 14 receives one or more GetBulk responses, SNMP manger application increments the value of RRC by the number of rows received in the most recent GetBulk response. The number of rows received in the Get-Bulk response is calculated as described above. In one example, if the GetBulk response is a response to a first GetBulk command and the GetBulk response includes five rows, then RRC, which was zero, is incremented by five and now equals five. If the GetBulk response is a response to a GetBulk command other than the first command, then the previous value of RRC is incremented by the number of rows received in the current GetBulk response. For example, if RRC is forty-seven before analyzing the current GetBulk response and SNMP management application 14 determines that the current Get Bulk response includes fourteen rows, then RRC is incremented by fourteen and equals sixty-one, after RRC is updated.

SNMP management application 14 updates max-repetitions (84) by selecting the lowest value of a number of possible values, which may include one or more of: (1) a number of rows calculated based on the values of MAX_VARBIND and NUM_COL and then incremented by EXT, i.e. (MAX_VARBIND/NUM_COL)+EXT; (2) a number of rows calculated based upon the values of EST_VARBIND and NUM_COL and then incremented by EXT, i.e. (EST_VARBIND/NUM_COL)+EXT; and (3) a number of rows calculated based upon the values of ERC and RRC and then incremented by EXT, i.e. (ERC−RRC)+EXT, but only if ERC is known. Continuing the example above where MAX_VARBIND is set to one hundred, EXT is set to ten, NUM_COL is set to five, EST_VARBIND is known and set to ninety, and ERC is known and set to ten, RRC is calculated above to equal five, the updated value of max-repetitions will be set to the smallest of: (1) (MAX_VARBIND/NUM_COL)+EXT, or (one hundred divided by five) plus ten, which equals thirty; (2) (EST_VARBIND/NUM_COL)+EXT, or (ninety divided by five) plus ten, which equals twenty-eight; and (3) (ERC−RRC)+EXT, or (ten minus five) plus ten, which equals fifteen. Therefore, in this example, the updated value of max-repetitions is set to fifteen.

Once RRC is updated and max-repetitions is set (84), SNMP management application 14 may issue a second Get-Bulk command. In an example where SNMP management application 14 issues a second GetBulk command (72), SNMP agent 18 processes the second GetBulk command in the same manner as it processed the first GetBulk command. SNMP management application 14 receives the response, analyzes the response (76), and updates the RRC and max-repetitions values as previously described (84). The issue-analysis-update loop continues until the column boundaries of the table have been crossed (78), meaning that all of the rows of the table have been received by SNMP management application 14. At any time, SNMP management application 14 may store the values of EST_VARBIND and RRC in GetBulk state data 16 for future retrieval, such as the next time SNMP management application 14 issues a GetBulk command on the same table. Preferably, after the column boundaries have been crossed, SNMP management application 14 updates any previously stored values with the last calculated values.

Figure 4:
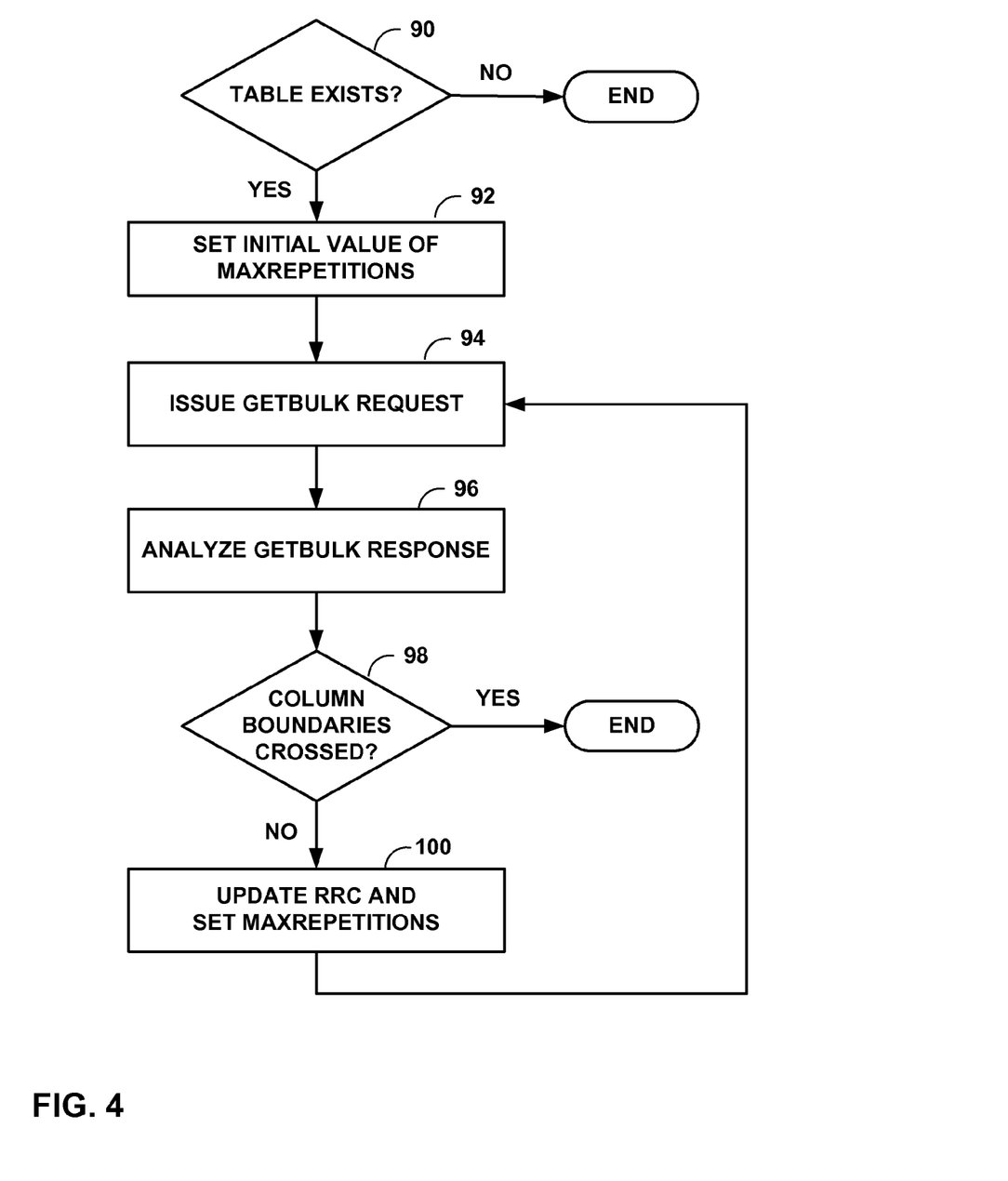
FIG. 4 is a flowchart illustrating another example method for optimizing SNMP GetBulk requests using the techniques of this disclosure.

FIG. 4 is a flowchart illustrating another example method to optimize a GetBulk command using the techniques of this disclosure. If, for example, SNMP agent 18 strictly limits the maximum number of variables allowed in a GetBulk response, it may be preferable to use the method illustrated in FIG. 4. When SNMP management application 14 strictly limits the maximum number of variables allowed in a GetBulk response, the total number of variables included in the response may not be greater than some application defined maximum value. When performing this method for optimizing a GetBulk command, the value of MAX_VARBIND is equal to the strict maximum number of variables allowed in a GetBulk response. The number of variables in a GetBulk response is equal to the product of max-repetitions and the number of columns to be queried.

When performing the example method illustrated in FIG. 4, SNMP management application 14 first determines if the desired table exists in MIB 20 (90). SNMP management application 14 may issue a single GetNext command on the table to be queried. If the response received from the GetNext command is a value from the desired table (YES in 90), then that table is present and GetBulk can be used. If the response received is not a value from the desired table (NO in 90), then GetBulk cannot be used and the method terminates.

Once it is determined that the table exists on the particular managed device 12 being queried, SNMP management application 14 utilizes a set of variables that include an expected row count (ERC), a received row count (RRC), the number of columns being queried (NUM_COL), an application defined lower initial value for the maximum number of results expected in one response (MIN_VARBIND), an application defined higher and maximum value for the maximum number of results expected in one response (MAX_VARBIND), an estimated maximum number of results expected in one response that is derived based upon analyzing one or more received responses (EST_VARBIND), and an application defined extension value used to increase the max-repetitions parameter value (EXT).

SNMP management application 14 sets an initial value for the max-repetitions parameter of the GetBulk command (92). In one example, SNMP management application 14 receives the initial value from an operator via administrator interface 22. In another example, SNMP management application 14 retrieves a previously stored value from GetBulk state data 16. In another example, SNMP management application 14 estimates the values of EST_VARBIND and RRC based on values stored in GetBulk state data 16 that were generated after performing the techniques of this disclosure on a different table of MIB 20, as described with respect to FIG. 3. In another example, SNMP management application 14 calculates an initial max-repetitions value by selecting the lowest value of a number of possible values. The possible values may include one or more of: 1) a number of rows calculated based on ERC, which is incremented by EXT, i.e. ERC+EXT, if ERC is known, otherwise a number of rows calculated based upon the values of MIN_VARBIND and NUM_COL and then incremented by EXT, i.e. (MIN_VARBIND/NUM_COL)+EXT; 2) a number of rows equal to the value of (MAX_VARBIND/NUM_COL); and 3) a number of rows calculated based upon the values of EST_VARBIND and NUM_COL and then incremented by EXT, i.e. (EST_VARBIND/NUM_COL)+EXT, but only if EST_VARBIND is known.

For example, where MIN_VARBIND is set to five, MAX_VARBIND is set to one hundred, EXT is set to ten, NUM_COL is set to five and ERC and EST_VARBIND are not known, the initial value of max-repetitions will be set to the smallest of: (1) a number of rows calculated based upon MIN_VARBIND and NUM_COL and then incremented by EXT, i.e. (MIN_VARBIND/NUM_COL)+EXT, or (five divided by five) plus ten, which equals eleven; and (2) a number of rows calculated based upon MAX_VARBIND and NUM_COL, i.e. MAX_VARBIND/NUM_COL, or one hundred divided by five, which equals twenty. The number of rows calculated based upon the values of EST_VARBIND and NUM_COL is not calculated because EST_VARBIND is not known. Similarly, the number of rows based upon ERC and incremented by EXT is not calculated because ERC is not known. Therefore, in this example, the initial value of max-repetitions is set to eleven.

In another example, ERC is known and is set to eight and EST_VARBIND is known and is set to ninety, the values of the other variables are as described above. In this example, the initial value of max-repetitions will be set to the smallest of: (1) ERC+EXT, i.e. eight plus ten, which equals eighteen; (2) MAX_VARBIND/NUM_COL, i.e. one hundred divided by five, which equals twenty; and (3) (EST_VARBIND/NUM_COL)+EXT, i.e. ninety divided by five, plus ten, which equals twenty-eight. Therefore, the initial value of max-repetitions is set to eighteen.

In another example, ERC is not known, EST_VARBIND is known and is set to ninety, and the values of the other variables are as described above. In this example, SNMP management application 14 sets the initial value of max-repetitions to (EST_VARBIND/NUM_COL)+EXT, i.e. ninety divided by five, plus ten, which equals twenty-eight.

Once the initial value of max-repetitions is calculated and set, SNMP management application 14 issues a GetBulk command (94) to SNMP agent 18. The GetBulk command includes parameters as specified by the SNMPv2 or newer standard, such as max-repetitions, and object identifiers that specify the table and columns to be queried. Furthermore, SNMP agent 18 processes the GetBulk command according the SNMPv2 or newer standard and sends a GetBulk response to SNMP management application 14, as previously described with respect to FIG. 3.

SNMP management application 14 receives the GetBulk response from SNMP agent 18 and analyzes the GetBulk response (96). SNMP management application 14 may, for example, calculate the value of EST_VARBIND, calculate the effective number of max-repetitions, calculate the number of rows received in the response, and determine if the GetBulk response includes results outside the desired columns of the table. When calculating the value of EST_VARBIND, SNMP management application 14 analyzes the response and compares it to the expected response. For example, if the GetBulk command includes parameter values indicating that three columns are to be queried and max-repetitions is set to five, SNMP management application 14 expects the response to contain fifteen variable bindings. If the GetBulk response contains all fifteen variable bindings, SNMP management application 14 sets EST_VARBIND to fifteen, as shown in FIGS. 2A and 2C. If the GetBulk response contains fewer than fifteen variable bindings, as shown in FIGS. 2B and 2D, SNMP management application 14 sets EST_VARBIND to the number of variable bindings actually contained in the response. In the case of response 40, EST_VARBIND is set to thirteen.

When calculating the effective number of max-repetitions, SNMP management application 14 analyzes the response and compares it to the expected response in a similar manner as to when SNMP management application 14 calculates the value of EST_VARBIND. Continuing the example above, if the GetBulk response contains all fifteen variable bindings, the effective number of max-repetitions is equal to the value of max-repetitions that was passed to SNMP agent 18 in the GetBulk command, which, in this case, is five. However, if the GetBulk response contains fewer than the expected fifteen variable bindings, such as thirteen, max-repetitions is set to the number of repetitions that include results for every queried column. Referring to FIGS. 2B and 2D, repetition 4 is the last repetition that includes responses for every queried column. Therefore, in the responses shown in FIGS. 2B and 2D, the effective number of max-repetitions is four.

SNMP management application 14 also determines the number of rows received in the GetBulk response. Each repetition of the response represents one row in the table. When determining the number of rows received, SNMP management application 14 examines both the how many repetitions include results for every queried column as well as whether the results for each repetition include only results from the desired column. Referring to FIG. 2C, the response includes four repetitions that include only results from the desired columns and a fifth repetition that includes results from outside the desired columns. In this example, the number of rows received equals four. Similarly, referring to FIG. 2D, the response includes three repetitions that include only results from the desired columns, a fourth repetition that includes results from a column outside of the desired columns, and a fifth repetition where only one result was returned and where the result is from a column outside of the desired columns. In this example, the number of rows received in the GetBulk response is three.

SNMP management application 14 not only analyzes the number of variable bindings contained in the response, but SNMP management application 14 also determines whether the column boundaries were crossed, i.e. whether the response contains variable bindings outside of the desired columns. Continuing the example where three columns are queried and max-repetitions is set to five, if all of the results included in the response correspond to the desired columns, as shown in responses 30 and 40, then the column boundaries have not been crossed. The GetBulk response may only include a truncated result set due to an insufficient number of bytes available in the response to include the complete set of results. However, as long as all of the included results correspond to the desired columns, the column boundaries have not been crossed. If, instead, the GetBulk response includes results corresponding to columns outside of the desired columns, as shown in responses 50 and 60, then the column boundaries have been crossed.

If the column boundaries have been crossed (YES in 98), SNMP management application terminates tuning the max-repetitions parameter. However, if the column boundaries have not been crossed (NO in 98), then SNMP management application 14 determines updates the received row count (RRC) with the number of rows received in the GetBulk response and updates the value of max-repetitions (100). When SNMP management application 14 issues the first GetBulk response as part of this tuning process, RRC is set to zero. As SNMP management application 14 receives one or more GetBulk responses, SNMP manger application increments the value of RRC by the number of rows received in the most recent GetBulk response. The number of rows received in the GetBulk response is calculated as described above. In one example, if the GetBulk response is a response to a first GetBulk command and the GetBulk response includes five rows, then RRC, which was zero, is incremented by five and now equals five. If the GetBulk response is a response to some GetBulk command other than the first command, then the previous value of RRC is incremented by the number of rows received in the current GetBulk response. For example, if RRC is forty-seven before analyzing the current GetBulk response and SNMP management application 14 determines that the current Get Bulk response includes fourteen rows, then RRC is incremented by fourteen and equals sixty-one, after RRC is updated.

SNMP management application 14 updates max-repetitions (100) by selecting the lowest value of a number of possible values, which may include one or more of: (1) a number of rows calculated based on the values of MAX_VARBIND and NUM_COL, i.e. (MAX_VARBIND/NUM_COL); (2) a number of rows calculated based upon the values of EST_VARBIND and NUM_COL and then incremented by EXT, i.e. (EST_VARBIND/NUM_COL)+EXT; and (3) a number of rows calculated based upon the values of ERC and RRC and then incremented by EXT, i.e. (ERC−RRC)+EXT, but only if ERC is known. Continuing the example above where MAX_VARBIND is set to one hundred, EXT is set to ten, NUM_COL is set to five, EST_VARBIND is known and set to ninety, and ERC is known and set to ten, RRC is calculated above to equal five, the updated value of max-repetitions will be set to the smallest of: (1) (MAX_VARBIND/NUM_COL), or one hundred divided by five, which equals twenty; (2) (EST_VARBIND/NUM_COL)+EXT, or (ninety divided by five) plus ten, which equals twenty-eight; and (3) (ERC−RRC)+EXT, or (ten minus five) plus ten, which equals fifteen. Therefore, in this example, the updated value of max-repetitions is set to fifteen. Once RRC is updated and max-repetitions is set (100), SNMP management application 14 issues a second GetBulk command (94). In an example where SNMP management application 14 issues a second GetBulk command, SNMP agent 18 processes the second GetBulk command in the same manner as it processed the first GetBulk command. SNMP management application 14 receives the response, analyzes the response (96), and updates the RRC and max-repetitions values as previously described (100). The issue-analysis-update loop continues until the column boundaries of the table have been crossed (YES in 98), meaning that all of the rows of the table have been received by SNMP management application 14. At any time, SNMP management application 14 may store the values of EST_VARBIND and RRC in GetBulk state data 16 for future retrieval, such as the next time SNMP management application 14 issues a GetBulk command on the same table. Preferably, after the column boundaries have been crossed, SNMP management application 14 updates any previously stored values with the last calculated values.

The techniques described with respect to FIGS. 3 and 4 may also be performed according to several different variations. For example, rather than setting the initial value of max-repetitions by selecting the lowest value of a number of different values, SNMP management application 14 may select the largest value of the number of different values and quickly resolve the value of EST_VARBIND and, from then on, maintain a relatively stable value for max-repetitions. In another example, SNMP management application may set the initial value of max-repetitions to a value calculated using the average of MIN_VARBIND and MAX_VARBIND. In this example, if the actual number of rows is higher than the initial value of max-repetitions and SNMP agent 18 may return more results in a single GetBulk response, then the techniques described increment the value of max-repetitions. However, if SNMP agent 18 may only return fewer results in a single GetBulk response than initially requested, then the techniques described quickly resolve the EST_VARBIND value and, after EST_VARBIND is resolved, maintain a relatively stable max-repetitions value.

In another variation, EXT may be split into two variables, EXT_INCREMENT and EXT_COLUMN_END. It is most useful to split EXT into two variables when ERC is known. EXT_INCREMENT may be used when max-repetitions is being upwardly adjusted in an attempt to calculate the highest possible EST_VARBIND value and EXT_COLUMN_END may be used to increment max-repetitions to ensure that column boundaries are crossed within the current GetBulk command. By splitting EXT into two variables, it is possible to calculate EST_VARBIND and max-repetitions more quickly than if only EXT is used, when ERC is known.

In another variation, SNMP management application 14 issues a GetBulk command on a table expected to have many rows, such as dot1dFdbTable, a MAC address forwarding table. If ERC is not known and EST_VARBIND is known, SNMP management application 14 sets the initial value of max-repetitions to the number of rows calculated based on the value of EST_VARBIND divided by the number of columns to be queried in the GetBulk command, i.e. EST_VARBIND/NUM_COL, and adjust the value of max-repetitions according to the techniques of this disclosure in each subsequent GetBulk command. In this manner, the optimal value of max-repetitions is quickly obtained while minimizing the number of variable bindings outside of the desired columns which are included in a GetBulk response.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
predicting, with a management device, an initial value for a repetition parameter of a bulk data retrieval command to specify a first number of repetitions for a managed network device to internally query a set of columns of a table of the managed device when processing the bulk data retrieval command, and wherein predicting the initial value is based on a number of rows included in a different table of the managed network device;
issuing, with the management device, the bulk data retrieval command to direct the managed network device to retrieve configuration variables stored within the set of columns of the table, wherein the repetition parameter is set to the predicted initial value;
receiving, with the management device, a response from the managed network device in response to the managed network device querying the table the first number of repetitions;
analyzing, with the management device, the response; and
updating an estimate of a number of variables expected to be received from the managed network device in a single response based on the analysis of the response by the management device.

2. The method of claim 1, further comprising issuing a second bulk data retrieval command to direct the managed network device to retrieve the configuration variables stored within the table, wherein the second bulk data retrieval command includes a repetition parameter that specifies a number of repetitions for the managed device to internally query the set of columns of the table when processing the second bulk data retrieval command, and wherein the repetition parameter of the second bulk data retrieval command is set based on the updated estimate of the number of the variables expected to be received from the managed network device in a single response.

3. The method of claim 2, further comprising
receiving a second response from the managed network device in response to the second bulk data retrieval command;
analyzing the second response;
updating the estimate of the number of variables expected to be received from the managed network device in a single response based on the analysis of the second response by the management device.

4. The method of claim 2, wherein the repetition parameter of the second bulk data retrieval command is set based on the number of rows received in the response incremented by an amount.

5. The method of claim 2, wherein the repetition parameter of the second bulk data retrieval command is set based on a maximum number of rows expected to be included in a single response from the managed network device less the number of rows received in the response, incremented by an amount.

6. The method of claim 2, wherein the repetition parameter of the second bulk data retrieval command is set based on an estimated number of rows expected to be received in a single response from the managed network device based on an estimated number of variables that may be stored in the response and the number of rows received in the response, incremented by an amount.

7. The method of claim 1, further comprising prior to issuing the bulk data retrieval command, determining, with the management device, whether configuration information of the managed network device includes the table by issuing a non-iterative data retrieval command to the managed device for retrieving a single row from the table.

8. The method of claim 1, further comprising
analyzing the response to determine a total number of results contained in the response received by the management device from the managed network device; and
updating the estimate of the number of variables expected to be received from the managed network device in a single response based on the total number of results.

9. The method of claim 1,
wherein predicting the initial value for the repetition parameter is further based on: (1) an expected row count for the table, (2) a minimum number of rows of the variables expected to be received in a single response to the bulk data retrieval command, and (3) a maximum number of rows of the variables expected to be received in a single response to the bulk data retrieval command.

10. The method of claim 9,
wherein analyzing the response further comprises determining an actual number of rows received in the response based on a number of results contained in the response that correspond to the set of columns of the table; and
updating the maximum number of rows of the variables expected to be received from the managed network device in a single response based on the analysis of the response by the management device.

11. The method of claim 1, wherein analyzing the response further comprises:
determining whether the response includes results outside the set of columns of the table; and
when the response does not include results outside the set of columns of the table, setting the repetition parameter as a function of the estimate of the number of variables expected to be received from the managed network device in a single response and an application-defined increment value prior to issuing a subsequent bulk data retrieval command to retrieve additional ones of the configuration variables stored within the set of columns of the table.

12. The method of claim 1, wherein the repetition parameter is set by dividing the estimate of the number of the variables expected to be received from the managed network device in a single response to the bulk data retrieval command by the number of columns in the set of columns.

13. The method of claim 1,
wherein predicting the initial value for the repetition parameter is further based on the estimate of the number of the variables expected to be received from the managed network device in a single response to the bulk data retrieval command and a predicted number of rows in the table.

14. The method of claim 1, wherein predicting the initial value for the repetition parameter is further based on an estimated row count of the table incremented by an amount.

15. The method of claim 14, wherein predicting the initial value for the repetition parameter is further based on a minimum number of rows expected to be included in a single response from the managed network device, incremented by an amount.

16. The method of claim 1, wherein predicting the initial value for the repetition parameter is further based on a maximum number of rows expected to be included in a single response from the managed network device, incremented by an amount.

17. The method of claim 1, wherein predicting the initial value for the repetition parameter is further based on an estimated number of variables expected to be included in the response, incremented by an amount.

18. The method of claim 1, wherein predicting the initial value for the repetition parameter of the bulk retrieval command is further based on the smallest value of:
an estimated row count of the table incremented by an amount,
a minimum number of rows expected to be included in the single response from the managed network device, incremented by an amount,
a maximum number of rows expected to be included in the single response from the managed network device, incremented by an amount, and
an estimated number of rows expected to be received in the single response from the managed network device, incremented by an amount.

19. The method of claim 1,
wherein analyzing the response comprises calculating a number of rows received in the response, and
where in updating the estimate of the number of variables expected to be received in a single response is based on the smallest value of:
an estimated row count of the table minus the number of rows received in the response, incremented by an amount,
a maximum number of rows expected to be included in the single response from the managed network device, incremented by an amount, and
an estimated number of rows expected to be received in the single response from the managed network device, incremented by an amount.

20. A network management device comprising:
a programmable hardware processor,
wherein the programmable hardware processor is configured to:
predict an initial value of a repetition parameter for a bulk data retrieval command to specify a first number of repetitions for a managed network device to internally query a set of columns of a table of the managed device when processing the bulk data retrieval command, and wherein predicting the initial value is based on a number of rows included in a different table of the managed network device;
issue the bulk data retrieval command to direct the managed network device to retrieve configuration information variables stored within the set of columns of the table, wherein the repetitions parameter is set based on the predicted initial value;
receive a response from the managed network device in response to the managed network device querying the table a first number of repetitions;
analyze the response; and
update an estimate of a number of variables expected to be received from the managed network device in a single response based on the analysis of the response.

21. The network management device of claim 20, wherein the programmable hardware processor is further configured to:
issue a second bulk data retrieval command to direct the managed network device to retrieve the configuration variables stored within the table, wherein the second bulk data retrieval command includes a repetition parameter that specifies a number of repetitions for the managed device to internally query the set of columns of the table when processing the second bulk data retrieval command, and wherein the repetition parameter of the second bulk data retrieval command is set based on the updated estimate of the number of the variables expected to be received from the managed network device in a single response.

22. The network management device of claim 21, wherein the programmable hardware processor is further configured to:
receive a second response from the managed network device in response to the second bulk data retrieval command;
analyze the second response; and
update the estimate of the number of variables expected to be received from the managed network device in a single response based on the analysis of the second response.

23. The network management device of claim 21, wherein the repetition parameter of the second bulk data retrieval command is set based on the number of rows received in the response incremented by an amount.

24. The network management device of claim 21, wherein the repetition parameter of the second bulk data retrieval command is set based on a maximum number of rows expected to be included in a single response from the managed network device less the number of rows received in the response, incremented by an amount.

25. The network management device of claim 21, wherein the repetition parameter of the second bulk data retrieval command is set based on an estimated number of rows expected to be received in a single response from the managed network device based on an estimated number of variables that may be stored in the response and the number of rows received in the response, incremented by an amount.

26. The network management device of claim 20, wherein the programmable hardware processor is further configured to:
determine a total number of results contained in the response; and
update the estimate of the number of variables expected to be received from the managed network device in a single response based on the total number of results.

27. The network management device of claim 20, wherein the programmable hardware processor configured to issue the bulk data retrieval command is configured to:
predict the initial value of the repetition parameter based on: (1) an expected row count for the table, (2) a minimum number of rows of the variables expected to be received in a single response to the bulk data retrieval command, and (3) a maximum number of rows of the variables expected to be received in a single response to the bulk data retrieval command.

28. The network management device of claim 27, wherein the programmable hardware processor is further configured to:
determine an actual number of rows received in the response based on a number of results contained in the response that correspond to the set of columns of the table; and update the maximum number of rows of the variables expected to be received from the managed network device in a single response based on the analysis of the response by the management device.

29. The network management device of claim 20, wherein the programmable hardware processor configured to analyze the response is further configured to:
determine whether the response includes results outside the set of columns of the first table; and
when the response does not include results outside the set of columns of the table, set the repetition parameter as a function of the estimate of the number of variables expected to be received from the managed network device in a single response and an application-defined increment value prior to issuing a subsequent bulk data retrieval command to retrieve additional ones of the configuration variables stored within the set of columns of the table.

30. The network management device of claim 20, wherein the initial value is predicted by at least dividing the estimate of the number of the variables expected to be received from the managed network device in a single response to the bulk data retrieval command by the number of columns in the set of columns.

31. The network management device of claim 20, wherein the initial value is predicted based on the estimate of the number of the variables expected to be received from the managed network device in a single response to the bulk data retrieval command and a predicted number of rows in the table.

32. The network management device of claim 20, wherein the initial value is predicted based on an estimated row count of the table incremented by an amount.

33. The network management device of claim 20, wherein the initial value is predicted based on a minimum number of rows expected to be included in a single response from the managed network device, incremented by an amount.

34. The network management device of claim 20, wherein the initial value is predicted based on a maximum number of rows expected to be included in a single response from the managed network device, incremented by an amount.

35. The network management device of claim 20, wherein the initial value is predicted based on an estimated number of variables expected to be included in the response, incremented by an amount.

36. The network management device of claim 20, wherein the initial value is predicted based on the smallest value of:
an estimated row count of the table incremented by an amount,
a minimum number of rows expected to be included in the single response from the managed network device, incremented by an amount,
a maximum number of rows expected to be included in the single response from the managed network device, incremented by an amount, and
an estimated number of rows expected to be received in the single response from the managed network device, incremented by an amount.

37. The network management device of claim 20, wherein the programmable hardware processor configured to analyze the response is further configured to calculate a number of rows received in the response, and wherein the updated estimate of the number of variables expected to be received from the managed network device in a single response is set based upon the smallest value of:
an estimated row count of the table minus the number of rows received in the response, incremented by an amount,
a maximum number of rows expected to be included in the single response from the managed network device, incremented by an amount, and
an estimated number of rows expected to be received in the single response from the managed network device, incremented by an amount.

38. A system comprising:
a managed network device; and
a management device, wherein the management device comprises a programmable hardware processor configured to:
predict an initial value for a repetition parameter of a bulk data retrieval command to specify a first number of repetitions for the managed network device to internally query a set of columns of a table of the managed device when processing the bulk data retrieval command, and wherein predicting the initial value is based on a number of rows included in a different table of the managed network device;
issue the bulk data retrieval command to direct the managed network device to retrieve configuration information variables stored within the set of columns of the table, wherein the repetitions parameter is set based on the predicted initial value;
receive a response from the managed network device in response to the managed network device querying the table the number of repetitions;
analyze the response; and
update a number of variables expected to be received from the managed network device in a single response based on the analysis of the response.

39. A non-transitory computer-readable medium comprising instructions for causing one or more programmable processors to:
predict an initial value for a repetition parameter of a bulk data retrieval command to specify a first number of repetitions for a managed network device to internally query a set of columns of a table of the managed device when processing the bulk data retrieval command, and wherein predicting the initial value is based on a number of rows included in a different table of the managed network device;
issue a bulk data retrieval command to direct the managed network device to retrieve configuration information variables stored within a set of columns of the table wherein the repetitions parameter is set based on the predicted initial value;
receive a response from the managed network device in response to the managed network device querying the table the number of repetitions;
analyze the response; and
update a number of variables expected to be received from the managed network device in a single response based on the analysis of the response.

* * * * *